US006868261B2

(12) United States Patent
Shi et al.

(10) Patent No.: US 6,868,261 B2
(45) Date of Patent: Mar. 15, 2005

(54) TRANSMITTER METHOD, APPARATUS, AND FREQUENCY PLAN FOR MINIMIZING SPURIOUS ENERGY

(75) Inventors: Hong Shi, Redondo Beach, CA (US); Frank Carr, Newport Beach, CA (US)

(73) Assignee: Broadcom Corporation, Irvine, CA (US)

( * ) Notice: Subject to any disclaimer, the term of this patent is extended or adjusted under 35 U.S.C. 154(b) by 243 days.

(21) Appl. No.: 10/108,986

(22) Filed: Mar. 29, 2002

(65) Prior Publication Data

US 2003/0092414 A1 May 15, 2003

Related U.S. Application Data

(60) Provisional application No. 60/316,966, filed on Sep. 5, 2001.

(51) Int. Cl.[7] .................................................. H04B 1/04
(52) U.S. Cl. .................... 455/114.2; 455/260; 455/63.1; 455/278.1
(58) Field of Search .............................. 455/260, 259, 455/255, 73, 76, 550.1, 91, 168.1, 552.1, 501, 432.1, 63.1, 67.13, 114.2; 327/147, 156; 331/1 R, 10, 16, 17, 25

(56) References Cited

U.S. PATENT DOCUMENTS

| | | | | |
|---|---|---|---|---|
| 5,818,303 | A | * 10/1998 | Oishi et al. | 331/1 A |
| 6,208,875 | B1 | 3/2001 | Damgaard et al. | |
| 6,308,049 | B1 | * 10/2001 | Bellaouar et al. | 455/76 |
| 6,516,184 | B1 | * 2/2003 | Damgaard et al. | 455/86 |
| 6,526,265 | B1 | * 2/2003 | Damgaard et al. | 455/118 |
| 6,560,297 | B1 | * 5/2003 | Broughton | 375/308 |
| 6,614,837 | B1 | * 9/2003 | Abdelgany et al. | 375/211 |
| 6,658,065 | B1 | * 12/2003 | Della Torre et al. | 375/296 |
| 6,766,158 | B1 | * 7/2004 | Molnar et al. | 455/323 |

FOREIGN PATENT DOCUMENTS

| | | |
|---|---|---|
| GB | 2 026 798 A | 2/1980 |
| WO | 97 30523 A | 8/1997 |

OTHER PUBLICATIONS

Razavi, B., "RF Transmitter Architectures and Circuits", *Proceedings of the IEEE 1999 Custom Integrated Circuits Conference*, San Diego, California, May 16–19, 1999, pp. 197–204.

Strange, J. and Atkinson, S., "A Direct Conversion Transceiver for Multi–Band GSM Application", *2000 IEEE Radio Frequency Integrated Circuits (RFIC) Symposium*, pp. 25–28.

Yamawaki, T. et al., "A 2.7–V GSM RF Transceiver IC", *IEEE Journal of Solid–State Circuits*, Dec. 1997, vol. 32, No. 12, pp. 2089–2096.

* cited by examiner

*Primary Examiner*—Sonny Trinh
(74) *Attorney, Agent, or Firm*—Sterne, Kessler, Goldstein & Fox, PLLC (57) ABSTRACT

A translational-loop transmitter includes a local oscillator (LO) generator for generating first and second LO signals, a modulator for generating a modulated reference signal using the second LO signal, and an offset phase-locked-loop (PLL) for phase-locking an output signal to the reference signal, and for tuning the output signal in accordance with the first LO signal. The PLL includes an offset mixer in a feedback path of the PLL, and operates in accordance with a frequency plan that minimizes the effects of on- and off-channel spurs at the output of the offset mixer.

40 Claims, 6 Drawing Sheets

| FREQ (MHz) | POWER (dBm) | M(•f$_{LO1}$) | n(•f$_{TX}$) |
|---|---|---|---|
| 146.67 | −76.1 | −5 | 6 |
| 146.67 | −1.3 | 1 | −1 |
| 293.33 | −65.5 | −4 | 5 |
| 293.33 | −47.3 | 2 | −2 |
| 440.00 | −55.0 | −3 | 4 |
| 440.00 | −47.0 | 3 | −3 |
| 586.67 | −65.4 | −2 | 3 |
| 586.67 | −46.8 | 4 | −4 |
| 733.33 | −36.2 | −1 | 2 |
| 733.33 | −54.5 | 5 | −5 |
| 880.00 | −25.2 | 0 | 1 |
| 880.00 | −66.4 | 6 | −6 |
| 1026.67 | −25.0 | 1 | 0 |
| 1173.33 | −65.5 | −4 | 6 |
| 1173.33 | −35.5 | 2 | −1 |
| 1320.00 | −51.2 | −3 | 5 |
| 1320.00 | −50.0 | 3 | −2 |
| 1466.67 | −44.2 | −2 | 4 |
| 1466.67 | −71.1 | 4 | −3 |
| 1613.33 | −29.7 | −1 | 3 |
| 1613.33 | −63.6 | 5 | −4 |
| 1760.00 | −32.0 | 0 | 2 |
| 1760.00 | −81.9 | 6 | −5 |
| 1906.67 | −12.2 | 1 | 1 |
| 2053.33 | −21.0 | 2 | 0 |
| 2200.00 | −82.0 | −3 | 6 |
| 2200.00 | −22.8 | 3 | −1 |
| 2346.67 | −67.5 | −2 | 5 |
| 2346.67 | −42.6 | 4 | −2 |
| 2493.33 | −58.6 | −1 | 4 |
| 2493.33 | −61.0 | 5 | −3 |
| 2640.00 | −52.1 | 0 | 3 |
| 2640.00 | −62.6 | 6 | −4 |
| 2786.67 | −50.9 | 1 | 2 |
| 2933.33 | −46.0 | 2 | 1 |
| 3080.00 | −56.0 | 3 | 0 |
| 3226.67 | −76.5 | −2 | 6 |
| 3226.67 | −48.4 | 4 | −1 |
| 3373.33 | −60.8 | −1 | 5 |
| 3373.33 | −59.6 | 5 | −2 |
| 3520.00 | −55.6 | 0 | 4 |
| 3520.00 | −76.3 | 6 | −3 |
| 3666.67 | −41.3 | 1 | 3 |
| 3813.33 | −52.1 | 2 | 2 |

FIG. 7

TRANSMITTER METHOD, APPARATUS, AND FREQUENCY PLAN FOR MINIMIZING SPURIOUS ENERGY

CROSS-REFERENCES TO RELATED APPLICATIONS

This application claims priority to U.S. Provisional Application No. 60/316,966, filed Sep. 5, 2001, entitled "Method and Apparatus of Generating LO for Minimizing On-Channel Spurs in a Translational Loop Transmitter," incorporated herein by reference in its entirety.

BACKGROUND OF THE INVENTION

1. Field of the Invention

The present invention relates generally to transmitters, and particularly, to such a transmitter that operates in accordance with a frequency plan to reduce spurious energy in the transmitter.

2. Related Art

A conventional communication transceiver includes a transmitter to generate an output signal having a tunable output signal frequency. One type of known transmitter is a translational-loop transmitter. The translational-loop transmitter includes an offset phase-locked-loop (PLL) to generate the output signal and phase-lock the output signal to a reference signal. The offset PLL includes an offset mixer in a feedback path of the PLL.

Devices used in the offset PLL, particularly the offset mixer, may have non-linear device characteristics tending to give rise to undesired spurious energy, known as "spurs," in the PLL. Often, the spurs are generated at frequencies and power levels that interfere with, and thus degrade, transmitter performance. One approach for minimizing the spurs is to use highly linear devices in the PLL, such as a highly-linear offset mixer. However, such highly linear devices are generally expensive. Therefore, there is a need to minimize or avoid spurs in a translational-loop transmitter, without resorting to such expensive, highly linear devices.

The competitive mobile communication market demands a compact, low cost, and low power transmitter for use in a communication transceiver. It is also desirable that the transmitter be capable of generating an output signal at a frequency in any one of multiple frequency bands, including the Global System for Mobile Communications (GSM), Digital Cellular Service (DCS), Personal Communication Service (PCS), and additional communication frequency bands, for example. Such transmitter operation is referred to as multi-band operation.

Therefore, there is a need for a transmitter that meets all of the above-mentioned needs.

SUMMARY OF THE INVENTION

The present invention is directed to a translational-loop transmitter that minimizes or avoids spurs, without resorting to expensive, highly linear devices. The transmitter includes an offset PLL and operates in accordance with a multi-band frequency plan that reduces and/or avoids spurs in the offset PLL. The offset PLL includes an offset mixer in a feedback path of the PLL. The offset mixer is responsive to a local oscillator (LO) signal applied to the offset mixer and used to establish an output signal frequency of the transmitter.

The frequency plan specifies frequency relationships between various signals used in the transmitter, including the output signal, the LO signal, and a desired intermediate frequency (IF) signal produced by the offset mixer in response to the output signal and the LO signal. The frequency plan is commensurate with a multi-band operation of the transmitter. The frequency plan achieves several advantageous goals. First, the frequency plan causes the offset mixer to generate any on-channel spurs at a spur power level that is significantly lower than the desired IF signal power level generated by the mixer. The on-channel spur power level is below the desired IF signal power level by an amount that is sufficient to cause the on-channel spur to have an insignificant impact on the performance of the offset PLL.

Second, the frequency plan causes the offset mixer to generate any off-channel spur(s) at a spur frequency that is separated from the desired IF signal frequency by a significant amount. Since the spur frequency is separated from the desired IF frequency by such an amount, a practically realizable filter after the offset mixer can substantially attenuate the off-channel spur.

The transmitter includes an LO generator having a source oscillator for generating a source LO signal. The LO generator derives the LO signal applied to the offset mixer from the source LO signal. According to the frequency plan, the source LO signal has a relatively high frequency, on the order of 4 GigaHertz (GHz), as compared to conventional transmitters. This permits the use of a relatively high frequency source oscillator having a relatively high Q value. The high frequency source oscillator has a smaller size than lower frequency oscillators, and thus contributes to a more compact transceiver. The high Q value of the source oscillator improves phase noise in the output signal generated by the offset PLL.

Therefore, the frequency plan reduces spurs to improve transmitter performance, reduces cost because expensive highly linear devices are avoided, and reduces both size and power consumption because a smaller source oscillator can be used. Moreover, the frequency plan accommodates multi-band operation of the transmitter.

According to one aspect of the present invention, a transmitter apparatus comprises an LO generator that generates an LO signal having a tunable frequency $f_{LO1}$. The transmitter also comprises a PLL that generates an output signal that is phase-locked to a reference signal. The output signal has a frequency $f_{TX}$ tunable within at least first and second alternative frequency bands responsive to the LO signal. The PLL includes an offset mixer in a feedback path of the PLL for generating a feedback signal having a desired frequency $f_{FB}$ responsive to the frequencies $f_{TX}$ and $f_{LO1}$, wherein the frequency $f_{FB}$ is approximately equal to 1/6 the frequency $f_{TX}$ when the frequency $f_{TX}$ is in each of the first and second frequency bands, and the frequency $f_{LO1}$ is approximately equal to 7/6 the frequency $f_{TX}$ when the frequency $f_{TX}$ is in each of the first and second frequency bands.

The frequency $f_{FB}$ is a first intermediate frequency when the frequency $f_{TX}$ is in the first frequency band and a second intermediate frequency separated from the first intermediate frequency when the frequency $f_{TX}$ is in the second frequency band. The PLL further comprises, following the feedback mixer, a first filter that passes the first intermediate frequency and rejects first spurious energy offset in frequency from the first intermediate frequency when the frequency $f_{TX}$ is in the first frequency band. The PLL further comprises a second filter that passes the second intermediate frequency and rejects second spurious energy offset in frequency from the second intermediate frequency when the frequency $f_{TX}$ is in the second frequency band.

According to another aspect of the present invention, the LO generator includes a source oscillator for generating a source signal having a frequency $f_{SLO}$, and a frequency divider circuit to produce the LO signal from the source signal. The frequency $f_{SLO}$ is approximately equal to 14/3 the frequency $f_{TX}$ when the frequency $f_{TX}$ is in the first frequency band, and the frequency $f_{SLO}$ is approximately equal to 7/3 the frequency $f_{TX}$ when the frequency $f_{TX}$ is in the second frequency band. The second frequency band is higher than the first frequency band According to yet another aspect of the present invention, the frequency $f_{TX}$ is tunable in a third frequency band, and in this case, the frequency $f_{SLO}$ is approximately equal to 7/3 the frequency $f_{TX}$, the frequency $f_{LO1}$ is approximately equal to 7/6 the frequency $f_{TX}$, and the frequency $f_{FB}$ is approximately equal to 1/6 the frequency $f_{TX}$.

Other aspects of the present invention include several methods corresponding to the transmitter apparatus described above.

Further aspects of the present invention will become apparent from the ensuing description. Also, the aspects of the present invention described above and below use a frequency plan of the present invention.

BRIEF DESCRIPTION OF THE FIGURES

The present invention is described with reference to the accompanying drawings. In the drawings, like reference numbers indicate identical or functionally similar elements.

DETAILED DESCRIPTION OF THE INVENTION

Figure 1:
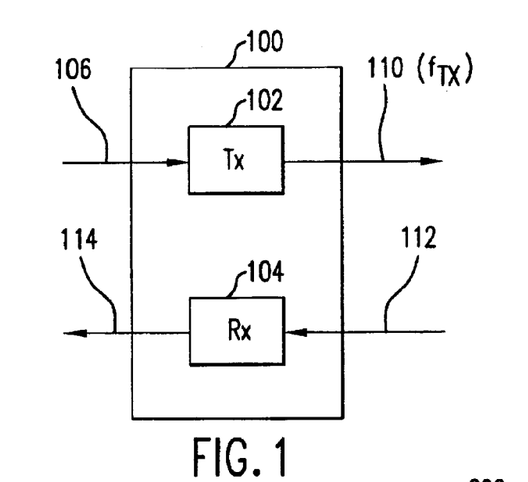
FIG. 1 is a block diagram of an example transceiver in which a transmitter of the present invention may be used.

FIG. 1 is a block diagram of an example transceiver 100 in which the present invention may be used. Transceiver 100 includes a transmit (Tx) subsystem 102 of the present invention and a receive (Rx) subsystem 104. Transmitter 102 receives a baseband signal 106, including one or more signals-to-be-transmitted such as a voice signal, a computer data signal, a cable system based signal, and so on. Transmitter 102 modulates and frequency-upconverts baseband signal 106 to a modulated radio frequency (RF) signal 110. Transceiver 100 then transmits signal 110 to a remote location either wirelessly or over cables, for example. In accordance with the present invention, transmitter 102 generates transmit signal 110 at a frequency $f_{TX}$ corresponding to either one of at least two or more separated communication frequency bands. Transmitter 102 can tune/adjust the frequency $f_{TX}$ to coincide with the communication channels of each of the frequency bands.

Receiver 104 receives a modulated RF signal 112. Receiver 104 frequency down-converts and demodulates the received signal 112 to produce a baseband signal 114.

Figure 2:
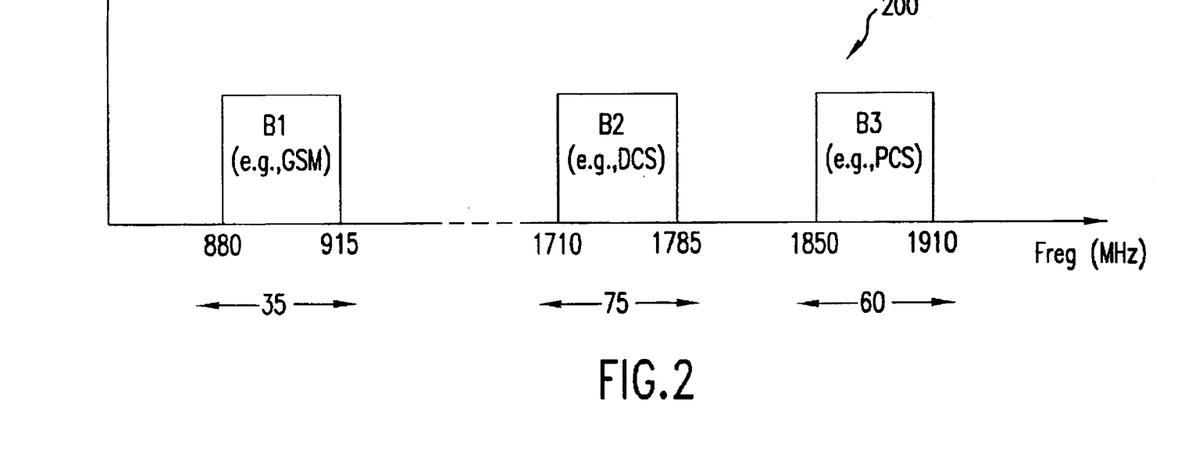
FIG. 2 is an illustration of an example transmit frequency plan of the transmitter of FIG. 1.

FIG. 2 is an illustration of an example transmit frequency plan 200 of transmitter 102. Transmitter 102 may generate frequency $f_{TX}$ within and tune the frequency $f_{TX}$ across any one of a plurality of "alternative" communication frequency bands B1, B2 and B3, each depicted in FIG. 2. The frequency bands are alternative because at any given time, frequency $f_{TX}$ is in frequency band B1, or alternatively in frequency band B2, or alternatively in frequency band B3.

In transmit frequency plan 200, frequency band B1 corresponds to the GSM band having respective minimum and maximum frequencies of 880 MegaHertz (MHz) and 915 MHz, frequency band B2 corresponds to the DCS frequency band having respective minimum and maximum frequencies of 1710 MHz and 1785 MHz, and frequency band B3 corresponds to the PCS frequency band having respective minimum and maximum frequencies of 1850 MHz and 1910 MHz. Transmitter 102 may generate frequency $f_{TX}$ in any one of the three alternative bands B1, B2 and B3 at any given time. Moreover, transmitter 102 may tune frequency $f_{TX}$ to coincide with any of the predefined frequency channels of any given band. The term "band" as used herein refers to a distinct frequency band, examples of which are provided above. It is to be understood that the different frequency channels within a single band are not considered different bands. For example, tuning frequency $f_{TX}$ from a first frequency channel to a second frequency channel in the PCS band does not constitute a band change, whereas tuning frequency $f_{TX}$ from a frequency channel in the PCS band to a frequency channel in the GSM band does constitute a band change.

Transmitter frequency bands B1, B2, and B3 depicted in FIG. 2 are exemplary. The present invention may operate in other combinations of frequency bands. Also the present invention may operate in any number of frequency bands (for example, four or five bands) instead of three bands. Also, the frequency bands may be contiguous as well as separated in frequency.

Transmitter Architecture
Overview

Figure 3:
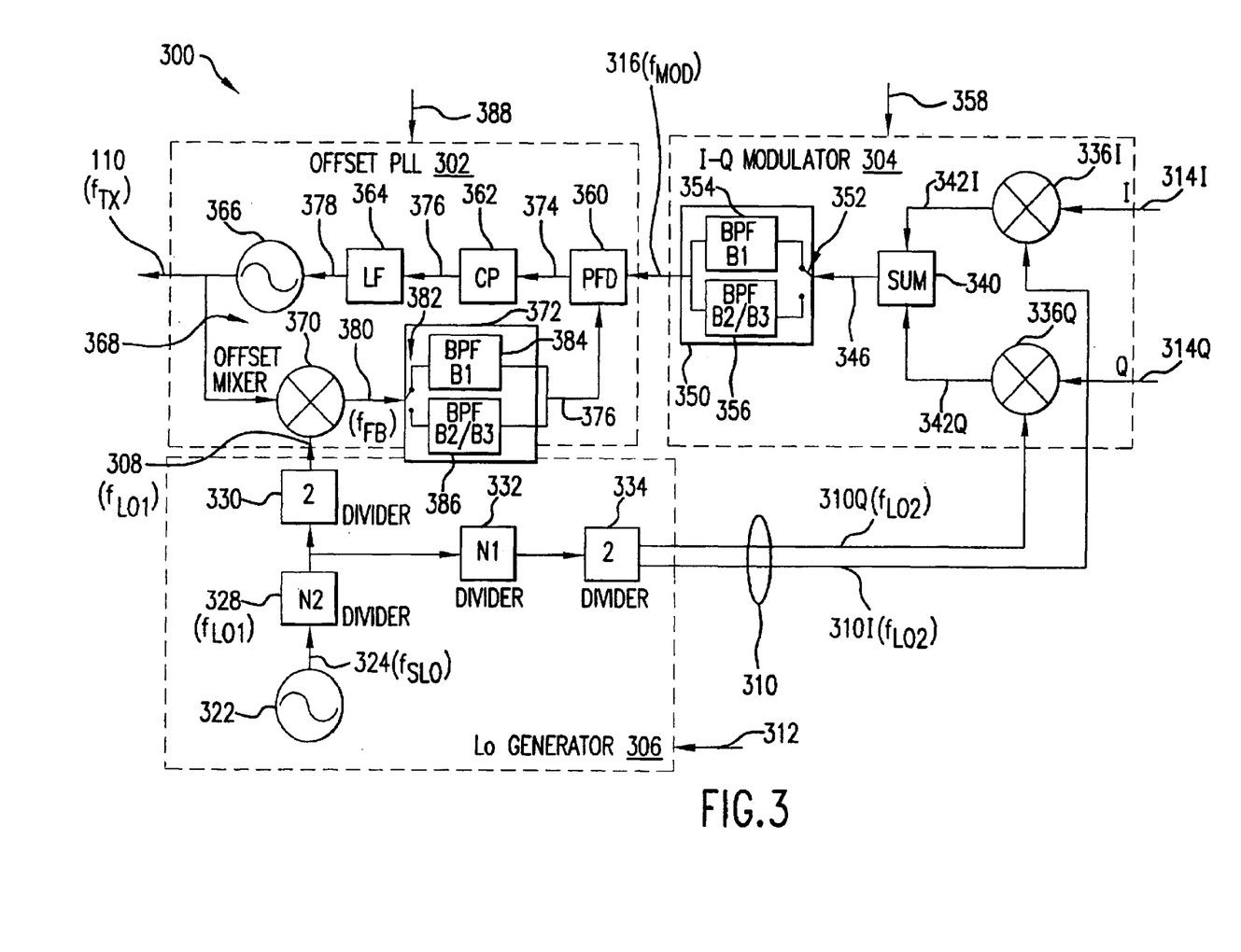
FIG. 3 is a block diagram of an example transmitter expanding on the transmitter of FIG. 1.

FIG. 3 is a block diagram of an example transmitter 300 corresponding to transmitter 102, according to an embodiment of the present invention. Transmitter 300 operates in accordance with a frequency plan of the present invention. First FIG. 3 is now described in detail, and then the frequency plan will be described. Transmitter 300 (also referred to as transmitter apparatus 300) includes an offset PLL 302 (sometimes referred to as a frequency translational loop), an I-Q modulator 304, and an LO generator 306. LO generator 306 generates a first LO signal 308 having a tunable frequency $f_{LO1}$. LO generator 306 also generates a second LO signal 310 including an I-component 310I and a Q-component 310Q offset from the I-component by 90 degrees. I- and Q-components 310I and 310Q each have a tunable frequency $f_{LO2}$. LO generator 306 may receive one or more analog and/or digital control signals 312 from an external controller, not shown, to control the frequencies $f_{LO1}$ and $f_{LO2}$ of respective LO signals 308 and 310.

I-Q modulator 304 receives I and Q baseband signals 314I and 314Q, respectively, which may be derived from baseband signal 106, for example. Modulator 304 modulates LO signal 310 using I and Q baseband signals 314I and 314Q, to produce a filtered, modulated IF signal 316. In one arrangement of the present invention, IF signal 316 is a constant amplitude, phase and/or frequency modulated signal having a frequency $f_{MOD}$. Modulator 304 provides modulated signal 316 to a reference input of PLL 302, as a reference signal for the PLL.

PLL 302 generates modulated output signal 110 (discussed above in connection with FIG. 1). PLL 302 phase-locks output signal 110 to modulated reference signal 316. PLL 302 generates output signal 110 at frequency $f_{TX}$ and can tune/adjust frequency $f_{TX}$ across each of at least two alternative frequency bands, in response to LO signal 308. That is, when LO generator tunes the frequency of LO signal 308, PLL 302 correspondingly tunes the frequency of output signal 110, as will be described further below.

LO Generator

LO generator 306 includes a frequency tunable source oscillator 322 that generates a source LO signal 324 having a frequency $f_{SLO}$ tunable in frequency in accordance with one of control signals 312. In accordance with the frequency plan of the present invention, frequency $f_{SLO}$ is approximately 4 GHz. In one arrangement of LO generator 306, source oscillator 322 is a Voltage Controlled Oscillator (VCO). Source oscillator 322 provides source LO signal 324 to a first frequency divider circuit comprising a programmable frequency divider 328 (divide by N2) followed by a divide-by-two frequency divider 330. The first frequency divider circuit produces first LO signal 308 by dividing-down the frequency of source oscillator signal 324 by N2 and then two.

Source oscillator 322 also provides source LO signal 324 to a second frequency divider circuit comprising shared programmable frequency divider 328, a programmable frequency divider 332 following divider 328, and a divide-by-two frequency divider 334 following divider 332. The second frequency divider circuit produces second LO signal 310 by frequency-dividing source oscillator signal 324 by N2, N1, and then two. Divider 334 generates signals 310I and 310Q in quadrature with each other, and at the required frequency. Frequency $f_{SLO}$ of source oscillator signal 324, and programmable dividers 328 and 332 may all be controlled in accordance with respective ones of control signals 312. An advantage of using high frequency oscillator 322 with the frequency plan of the present invention is that the frequency plan requires frequency $f_{SLO}$ to be divided-down, as described above. This reduces phase noise in first and second LO signals 308 and 310, relative to source signal 324. This in turn improves the phase noise performance of PLL 302.

Modulator

Modulator 304 includes an I-mixer 336I, a Q-mixer 336Q, and a signal summer 340 coupled to respective outputs of the I- and Q-mixers 336I and 336Q. I-mixer 336I produces an IF signal 342I from baseband signal 314I using LO signal 310I. In an alternative arrangement of transmitter 300, signals 314I and 314Q are IF signals rather than baseband signals. Mixer 336Q produces an IF signal 342Q from baseband signal 314Q using LO signal 310Q. Summer 340 combines IF signals 342I and 342Q into a modulated IF signal 346. IF signal 346 has a frequency, denoted generally as frequency $f_{MOD}$, controlled in accordance with frequency $f_{LO2}$. More specifically, in response to second LO signal 310, IF signal 346 has a first IF frequency $f_{MOD/B1}$ when apparatus 300 is to generate output signal 110 in band B1, and a second IF frequency $f_{MOD/B2/B3}$ when apparatus 300 is to generate output signal 110 in either of bands B2 and B3, as will be described more fully below. In accordance with an arrangement of the frequency plan, IF frequency $f_{MOD/B1}$ corresponds to a range of frequencies near 150 MHz, while IF frequency $f_{MOD/B2/B3}$ corresponds to a range of frequencies near 300 MHz.

Summer 340 provides IF signal 346 to a filter assembly 350 of modulator 304. Filter assembly 350 includes an input signal selector 352 coupled to an input of the filter assembly, a first bandpass filter (BPF) 354 corresponding to frequency band B1, and a second BPF 356 corresponding to both frequency bands B2 and B3, the bandpass filters (BPFs) being coupled to respective outputs of input selector 352. BPF 354 has a filter response that passes first IF frequency $f_{MOD/B1}$, and BPF 356 has a filter response that passes the second IF frequency $f_{MOD/B2/B3}$. BPFs 354 and 356 have exemplary 3 decibel (dB) passband bandwidths of approximately 20 MHz.

Selector 352 selectively routes IF signal 346 to either BPF 354 or BPF 356, in accordance with one or more control signals 358 used for controlling modulator 304. When selector 352 routes IF signal 346 to BPF 354, BPF 354 filters IF signal 346 to produce filtered reference signal 316. Alternatively, when selector 352 routes IF signal 346 to BPF 356, BPF 356 filters the IF signal to produce filtered reference signal 316.

Offset PLL

PLL 302 includes a phase or frequency detector 360 having a first input coupled to the reference input of the PLL, a charge pump 362 following the detector 360, a low pass filter 364 following the charge pump, and a frequency tunable oscillator 366, such as a VCO, following the low pass filter. PLL 302 further includes a PLL feedback path 368 coupled between an output of oscillator 366 and a second input of detector 360. Feedback path 368 includes an offset mixer 370 following VCO 366, and a filter assembly 372 following the offset mixer.

Phase or frequency detector 360 generates an error signal 374 responsive to a phase or frequency difference between reference signal 316 from modulator 304 and a filtered-feedback signal 376 generated by feedback path 368 (for example, output by feedback filter assembly 372). Charge pump 362 generates a current signal 376 representative of error signal 374. Low pass filter 364 produces a control voltage 378 in response to current signal 376. Charge pump 362 and low pass filter 364 represent a control signal deriving circuit that derives a control signal (for example, the control voltage 378) from the error signal 374. VCO 366 generates output signal 110 at a phase and frequency ($f_{TX}$) responsive to control signal 378.

Offset mixer 370 frequency-mixes output signal 110 with first LO signal 308 to produce an IF feedback signal 380. IF feedback signal 380 has a frequency, denoted generally as frequency $f_{FB}$, responsive to LO signal 308. Specifically, in response to LO signal 310, IF feedback signal 380 has a first IF frequency $f_{FB/B1}$ when PLL is to generate output signal 110 in band B1, and a second IF frequency $f_{FB/B2/B3}$ when apparatus 300 is to generate output signal 110 in either of bands B2 and B3, as will be described more fully below. In accordance with the arrangement of the frequency plan mentioned above, IF frequency $f_{FB/B1}$ corresponds to a range of frequencies near 150 MHz (as does IF frequency $f_{MOD/B1}$), while IF frequency $f_{FB/B2/B3}$ corresponds to a range of frequencies near 300 MHz (as does IF frequency $f_{MOD/B2/B3}$).

Offset mixer 370 provides feedback signal 380 to an input of filter assembly 372. Filter assembly 372 includes an input selector 382 coupled to the input of the filter assembly, a first BPF 384 corresponding to frequency band B1, and a second BPF 386 corresponding to frequency bands B2 and B3, the BPFs being coupled to respective outputs of input selector 382. BPF 384 has a filter response that passes first IF frequency $f_{FB/B1}$, and BPF 386 has a filter response that passes the second IF frequency $f_{FB/B2/B3}$. BPFs 384 and 386 have exemplary 3 dB passband bandwidths of approximately 20 MHz.

Filter assembly 372 operates in substantially the same manner as filter assembly 350 of modulator 304, whereby input selector 382 selectively routes IF signal 380 to either BPF 384 or BPF 386 depending on whether frequency $f_{TX}$ is to be generated in band B1 or in one of bands B2 or B3, respectively. Selector 382 is controlled in accordance with a control signal included in one or more control signals 386 used to control PLL 302. When selector 382 routes IF feedback signal 380 to BPF 384, BPF 384 filters IF feedback signal 380 to produce filtered feedback signal 376, mentioned above. Alternatively, when selector 382 routes IF feedback signal 380 to BPF 386, BPF 386 filters the IF feedback signal to produce filtered reference signal 376. Therefore, filtered feedback signal 376 has the same frequency as feedback signal 380, namely, frequency $f_{FB}$ (or more specifically, frequency $f_{FB/B1}$ or $f_{FB/B2/B3}$).

Under a steady state operating condition of apparatus 300, first and second LO signals 308 and 310 have respective frequencies $f_{LO1}$ and $f_{LO2}$ that cause:

1. output signal 110 to have a desired frequency ($f_{TX}$) within one of frequency bands B1, B2 or B3; and 2. reference signal 316 and feedback signal 380 to have substantially equal frequencies (that is, frequency $f_{MOD}=$ frequency $f_{FB}$) corresponding to desired frequency $f_{TX}$.

Since IF frequencies $f_{MOD}$ and $f_{FB}$ are substantially the same in the present invention, they are both also referred to herein as frequency $f_{IF}$. Under the steady state operating condition, phase or frequency detector 360 receives input signals 316 and 376 having substantially equal respective frequencies $f_{MOD}$ and $f_{FB}$, and PLL 302 adjusts frequency $f_{TX}$ of oscillator 366 to maintain frequency $f_{FB}$ equal to frequency $f_{MOD}$. Also, signals 316 and 376 have substantially equal respective phases, and PLL 302 adjusts the phase of oscillator 366 (that is, the phase of signal 110) to maintain the phase of signal 316 substantially equal to that of signal 376.

LO generator 306 adjusts/tunes frequency $f_{LO1}$ to correspondingly adjust/tune frequency $f_{TX}$, in the following manner. When LO generator 306 adjusts frequency $f_{LO1}$, offset mixer 370 correspondingly adjusts frequency $f_{FB}$. This introduces a corresponding frequency offset between frequency $f_{FB}$ and frequency $f_{MOD}$. PLL 302 senses the frequency offset (using detector 360), and in response, adjusts frequency $f_{TX}$ to reduce/eliminate the frequency offset. In this manner, LO generator establishes and tunes frequency $f_{TX}$. Similarly, when LO generator 306 adjusts the phase of LO signal 308, mixer 370 correspondingly adjusts the phase of feedback signal 380, and thus, the phase of signal 376. This introduces a corresponding phase offset between the phase of signal 380 (and signal 376) and the phase of signal 316. PLL 302 senses the phase offset (using detector 360), and in response, adjusts the phase of signal 110 to reduce/eliminate the phase offset.

Frequency Plan

As mentioned above, offset mixer 370 tends to generate undesired harmonic spurs (also referred to as harmonic interference) at its output due to non-linearities of the mixer. Example harmonic spurs have frequencies equal to $n \cdot f_{TX} \pm m \cdot f_{LO1}$, where n and m are integers. The harmonic spurs include on-channel spurs and off-channel spurs. An on-channel spur, at the output of offset mixer 370, is a harmonic spur having a frequency coinciding with the desired IF frequency $f_{FB}$ of feedback signal 380. On the other hand, an off-channel spur is separated in frequency from the desired frequency $f_{FB}$.

Both on- and off-channel spurs appear at the output of mixer 370, that is, in feedback signal 380, and can disrupt or degrade the operation of PLL 302. Therefore, apparatus 300 operates in accordance with the frequency plan of the present invention to reduce and/or avoid such spurs in PLL 302. The frequency plan of the present invention achieves several goals.

First, the frequency plan causes mixer 370 to generate any on-channel spur at a spur power level that is significantly lower than a desired IF signal power level (that is, the IF signal at frequency $f_{FB}$) generated by the mixer. The on-channel spur power level is below the desired IF signal power level by an amount that is sufficient to cause the on-channel spur to have an insignificant impact on the performance of PLL 302. For example, using the frequency plan of the present invention, an on-channel spur corresponding to the harmonic combination $6 \cdot f_{TX} - 5 \cdot f_{LO1}$ has a spur power level below −75 decibels-with-respect-to-carrier (dBc) (that is, 75 dB below the desired IF signal at frequency $f_{FB}$).

Second, the frequency plan causes mixer 270 to generate any off-channel spur(s) at a spur frequency that is separated from the desired IF frequency $f_{FB}$ by a significant amount. The frequency plan causes the off-channel spur(s) to be separated from the desired IF frequency $f_{FB}$ by an amount equal to or greater than frequency $f_{FB}$. For example, when the desired IF frequency $f_{FB}$ is 150 MHz, off-channel spurs may occur at or near 300 MHz, 600 MHz, and so on. Alternatively, when the desired IF frequency $f_{FB}$ is 300 MHz, off-channel spurs may occur at or near 600 MHz, 900 MHz, and so on. In this arrangement, the off-channel spurs are offset in frequency from the desired IF frequency $f_{FB}$ by at least an integer multiple of desired IF frequency $f_{FB}$.

Since the spur frequency is separated from the desired IF frequency $f_{FB}$ by such a large amount, a practically realizable BPF having a passband centered around the desired frequency $f_{FB}$ can substantially attenuate the off-channel spur. BPF 384 and 386 serve this purpose. In an alternative arrangement of the present invention, BPF 384 and 386 are replaced with low pass filters capable of attenuating the off-channel spurs.

Apparatus 300 operates in accordance with an example, generalized frequency plan represented in Table 1, below. The frequency plan of Table 1 achieves the goals mentioned above. In Table 1, column 1 lists various signals used in apparatus 300, described above. Column 2 identifies a frequency derivation plan, that is, a frequency relationship between signal frequencies of apparatus 300, corresponding to each signal listed in column 1. The desired signal frequencies $f_{TX}$, $f_{SLO}$, $f_{LO1}$, $f_{LO2}$, and $f_{IF}$ (representing both $f_{FB}$ and $f_{MOD}$) described above in connection with FIGS. 1 and 3 are frequency band dependent. Therefore, in Table 1, subscripted frequency band identifiers (for example, B1, or B2 and B3) are appended to the frequency designators used previously (for example, designators $f_{TX}$, $f_{SLO}$, and so on) to identify the corresponding frequency band. Specifically, in Table 1 below:

| | |
|---|---|
| $f_{TX/B1}$ | represents the frequency $f_{TX}$ used for band B1; |
| $f_{TX/B2/B3}$ | represents the frequency $f_{TX}$ used for bands B2 and B3; |
| $f_{SLO/B1}$ | represents the frequency $f_{SLO}$ used for band B1; |
| $f_{SLO,B2/B3}$ | represents the frequency $f_{SLO}$ used for bands B2 and B3; |
| $f_{IF,B1}$ | represents both frequencies $f_{FB}$ and $f_{MOD}$ used for band B1 (since frequencies $f_{FB}$ and $f_{MOD}$ are the same frequency); |

-continued

| | |
|---|---|
| $f_{IF/B2/B3}$ | represents both frequencies $f_{FB}$ and $f_{MOD}$ used for bands B2 and B3; |
| $f_{LO1/B1}$ | represents the frequency $f_{LO1}$ used for band B1; |
| $f_{LO1/B2/B3}$ | represents the frequency $f_{LO1}$ used for bands B2 and B3; |
| $f_{LO2/B1}$ | represents the frequency $f_{LO1}$ used for band B1; and |
| $f_{LO2/B2/B3}$ | represents the frequency $f_{LO2}$ used for bands B2 and B3. |

Also, as mentioned above, output signal 110, reference signal 316, and feedback signal 380 are all phase and/or frequency modulated signals. Therefore, each signal includes a carrier frequency component in addition to modulation frequency components. Therefore, it is convenient to consider the frequencies $f_{TX}$, $f_{MOD}$ and $f_{FB}$ as being representative of, but not necessarily limited to, the respective carrier frequency components of signals 110, 316, and 380.

TABLE 1

Generalized Frequency Plan for apparatus 300

| Signal (frequency designator) | | Frequency Derivation (based on a desired value of frequency $f_{TX}$) |
|---|---|---|
| source LO signal 324 ($f_{SLO}$) | $f_{SLO/B1}$ = | $14/3 \cdot f_{TX/B1}$ |
| source LO signal 324 ($f_{SLO}$) | $f_{SLO/B2/B3}$ = | $7/3 \cdot f_{TX/B2/B3}$ |
| IF signals 380, 316 ($f_{FB},f_{MOD}$) | $f_{IF/B1}$ = | $1/6 \cdot f_{TX/B1}$ |
| IF signals 380, 316 ($f_{FB},f_{MOD}$) | $f_{IF/B2/B3}$ = | $1/6 \cdot f_{TX/B2/B3}$ |
| first LO signal 308 ($f_{LO1}$) | $f_{LO1/B1}$ = | $7/6 \cdot f_{TX/B1}$ |
| first LO signal 308 ($f_{LO1}$) | $f_{LO1/B2/B3}$ = | $7/6 \cdot f_{TX/B2/B3}$ |
| second LO signal 310 ($f_{LO2}$) | $f_{LO2,B1}$ = | $1/6 \cdot f_{TX/B1}$ |
| second LO signal 310 ($f_{LO2}$) | $f_{LO2/B2/B3}$ = | $1/6 \cdot f_{TX/B2/B3}$ |

The generalized frequency plan of Table 1 above includes a set of equations relating frequency $f_{TX}$ to other signal frequencies. However practical/design limitations of transmitter 300, such as noise in analog circuits, frequency inaccuracy in the source oscillator, truncation of values in digital circuits, and so on, may prevent the transmitter from realizing the absolute "equalities" specified in Table 1, in practice. In light of this, a transmitter operating in accordance with the present invention will most likely approximate the equations of Table 1. For example, under such circumstances, frequency $f_{LO1/B1}$ is approximately equal to 7/6 the frequency $f_{TX/B1}$, frequency $f_{LO1/B2/B3}$ is approximately equal to 7/6 the frequency $f_{TX/B2/B3}$, and so on for each of the relationships specified in Table 1. It is to be understood that approximating the frequency plan in this manner is intended to be within the scope of the present invention.

Also, one or more, but less than all, of the relationships in the frequency plan of Table 1 may be practiced in the present invention to improve transmitter performance over conventional systems. For example, a transmitter operating in accordance with the principles of the present invention may implement the above specified frequency relationships for frequencies $f_{LO1}$ and $f_{TX}$, only. However, further advantages may be gained from using all of the relationships.

According to the frequency plan of Table 1, frequency $f_{LO1}=7/6 \cdot f_{TX}$, and thus, frequency $f_{LO1}>f_{TX}$, in all three frequency bands (that is, when frequency $f_{TX}$ is in any one of the first, second, and third alternative frequency bands B1, B2, and B3, respectively). Therefore, LO generator 306 high-side injects LO signal 308 to offset mixer 370 in all three frequency bands.

Also according to the frequency plan, frequency $f_{FB}$ (as represented by $f_{IF}$)=$1/6 \cdot f_{TX}$, in all three alternative frequency bands. Therefore, frequency $f_{FB}$ is a difference frequency $f_{LO1}-f_{TX}$ (that is, $7/6 \cdot f_{TX}-f_{TX}=1/6 \cdot f_{TX}$) generated by mixer 370.

Also according to the frequency plan:

$f_{SLO}$ ($f_{SLO/B1}$)=$14/3 \cdot f_{TX}$ when frequency $f_{TX}$ is in the first frequency band B1; and $f_{SLO}$ ($f_{SLO/B2/B3}$)=$7/3 \cdot f_{TX}$ when frequency $f_{TX}$ is in the second and third frequency bands B2 and B3.

The multiplier 14/3 of $f_{TX}$ used in frequency band B1 is double the value of the multiplier of 7/3 used in frequency band B2. Therefore, the ratio of frequency $f_{SLO/B1}$ to frequency $f_{SLO/B2/B3}$ (that is, $f_{SLO/B1}:f_{SLO/B2/B3}$) is 2 to 1 (that is, 2:1). This arises from a band-step frequency relationship between frequency band B1 and frequency bands B2 and B3, as is now described. An approximate center frequency of frequency band B1 is 900 MHz; thus, consider 900 MHz as being representative of band B1. Also, an approximate frequency between frequency bands B2 and B3 is 1800 MHz because bands B1 and B3 straddle 1800 MHz; thus, consider 1800 MHz as being representative of both bands B2 and B3, even though 1800 MHz is close to, but not actually within, either band. Thus, when frequency $f_{TX}$ band-steps from band B1 (900 MHz) to either of bands B2 and B3 (1800 MHz, approximately), frequency $f_{TX}$ doubles, approximately. To compensate for the band-step in frequency $f_{TX}$, the multiplier of $f_{TX}$ steps from the value 14/3 to the value $7/3 \cdot f_{TX}$, whereby the multiplier is halved.

Table 2 below represents a specific frequency plan used by apparatus 300. The specific frequency plan of Table 2 is derived from the generalized frequency plan of Table 1, using the frequency relationships specified in Table 1. The frequency plan of Table 2 assumes apparatus 300 can generate frequency $f_{TX}$ in any one of the three bands B1, B2 and B3, corresponding to the GSM, DCS, and PCS frequency bands respectively. Table 2 also specifies numeric values for divide-by-numbers N1 and N2 (corresponding to respective dividers 328 and 331).

TABLE 2

Specific Frequency Plan (frequencies in MHz)

| | B1 (e.g., GSM) | | B2 (e.g., DCS) | | B3 (e.g., PCS) | |
|---|---|---|---|---|---|---|
| | Min Freq. | Max Freq. | Min. Freq. | Max. Freq. | Min. Freq. | Max. Freq. |
| $f_{TX}$ range | 880 | 915 | 1710 | 1785 | 1850 | 1910 |
| $f_{SLO}$ range | 4106.667 | 4270 | 3990 | 4165 | 4316.667 | 4456.667 |
| N1 (divide-by-no.) | 7 | 7 | 7 | 7 | 7 | 7 |
| N2 (divide-by-no.) | 2 | 2 | 1 | 1 | 1 | 1 |
| $f_{FB}$ ($f_{IF}$) | 146.7 | 152.5 | 285.0 | 297.5 | 308.3 | 318.3 |
| $f_{LO1}$ | 1026.667 | 1067.5 | 1995.0 | 2082.5 | 2158.3 | 2228.3 |
| $f_{MOD}$ ($f_{IF}$) | 146.7 | 152.5 | 285.0 | 297.5 | 308.3 | 318.3 |

According to the specific frequency plan of Table 2, frequency $f_{FB}$ and $f_{MOD}$ (represented as frequency $f_{IF}$ in Table 1) vary slightly within a relatively narrow frequency range as frequency $f_{TX}$ is tuned across each band. Also, since source LO signal 324 is used to generate both the first and second LO signals 308 and 310 (that is, the LO signal of offset mixer 370 and the LO signal of modulator 304) using the above-described frequency divider circuits, the following equation applies:

$$\frac{f_{SLO}}{2 \cdot N1 \cdot N2} = \frac{f_{SLO}}{2 \cdot N2} - f_{TX}$$

Alternative Arrangements

Figure 4:
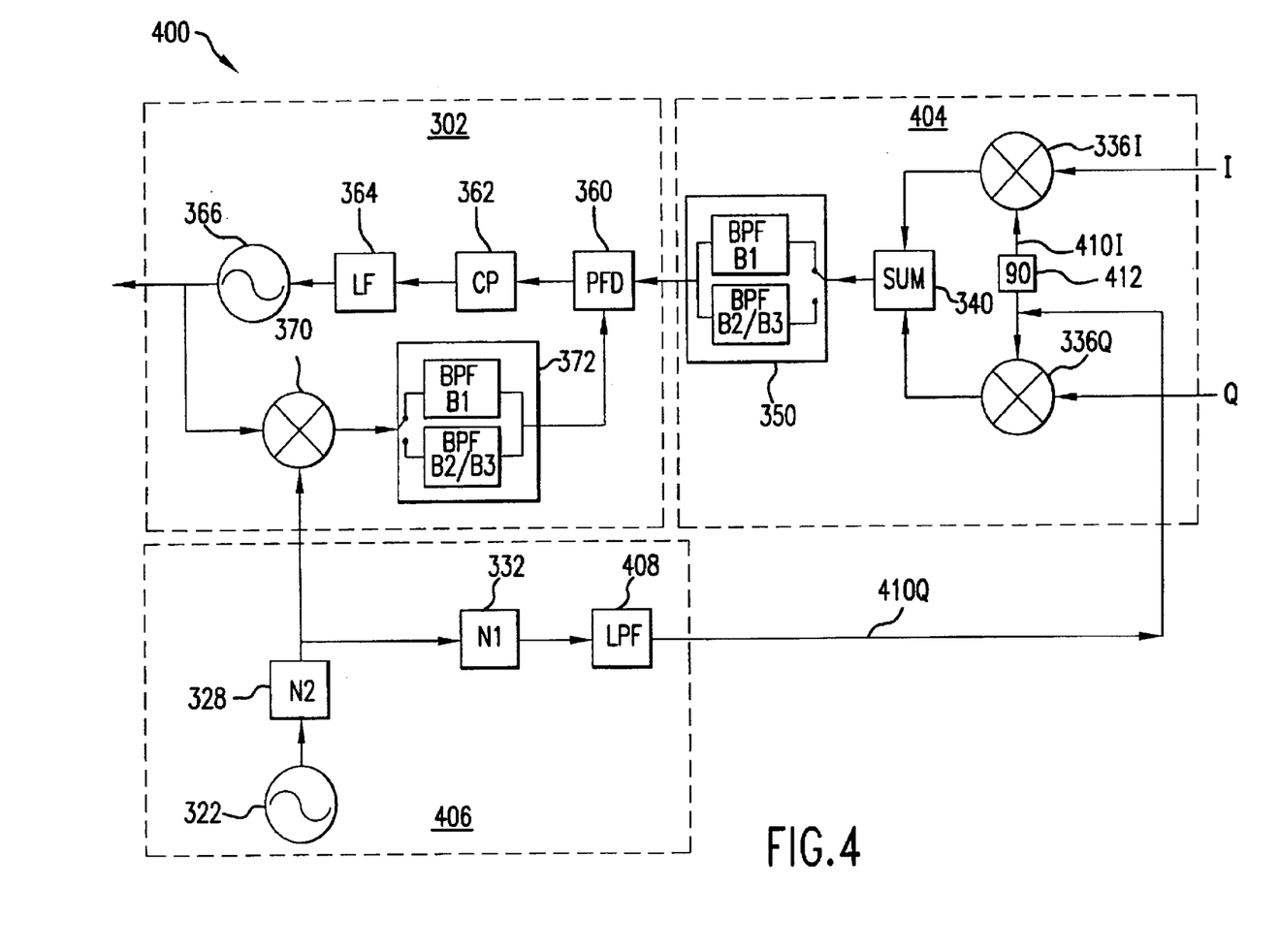
FIG. 4 is a block diagram of an another example transmitter corresponding to the transmitter of FIG. 1.

FIG. 4 is a block diagram of an example transmitter 400 corresponding to transmitter 102, according to another embodiment of the present invention. Transmitter 400 operates in accordance with the generalized frequency plan of Table 1. Transmitter 400 includes an LO generator 406 similar to LO generator 306, with the following exceptions. The divide-by-two dividers 330 and 334 of LO generator 306 are omitted from LO generator 406. LO generator 406 includes a low pass filter (LPF) 408 following divider 332 (N1) instead of divide-by-two divider 334. LPF 408 produces an LO signal 410Q from the signal produced by divider 332. The frequency of LO signal 410Q is frequency $f_{LO2}$.

LO generator 406 provides LO signal 410Q to mixer 336Q of I-Q modulator 404, and to a 90° phase shifter 412 coupled between mixers 336I and 336Q in I-Q modulator 404. Phase shifter 412 produces an LO signal 410I shifted in phase by 90° from signal 410Q, and provides LO signal 410I to mixer 336I. Therefore, the I/Q signal generation function performed by divider 334 of transmitter 300 resides in modulator 404 of transmitter 400.

Figure 5:
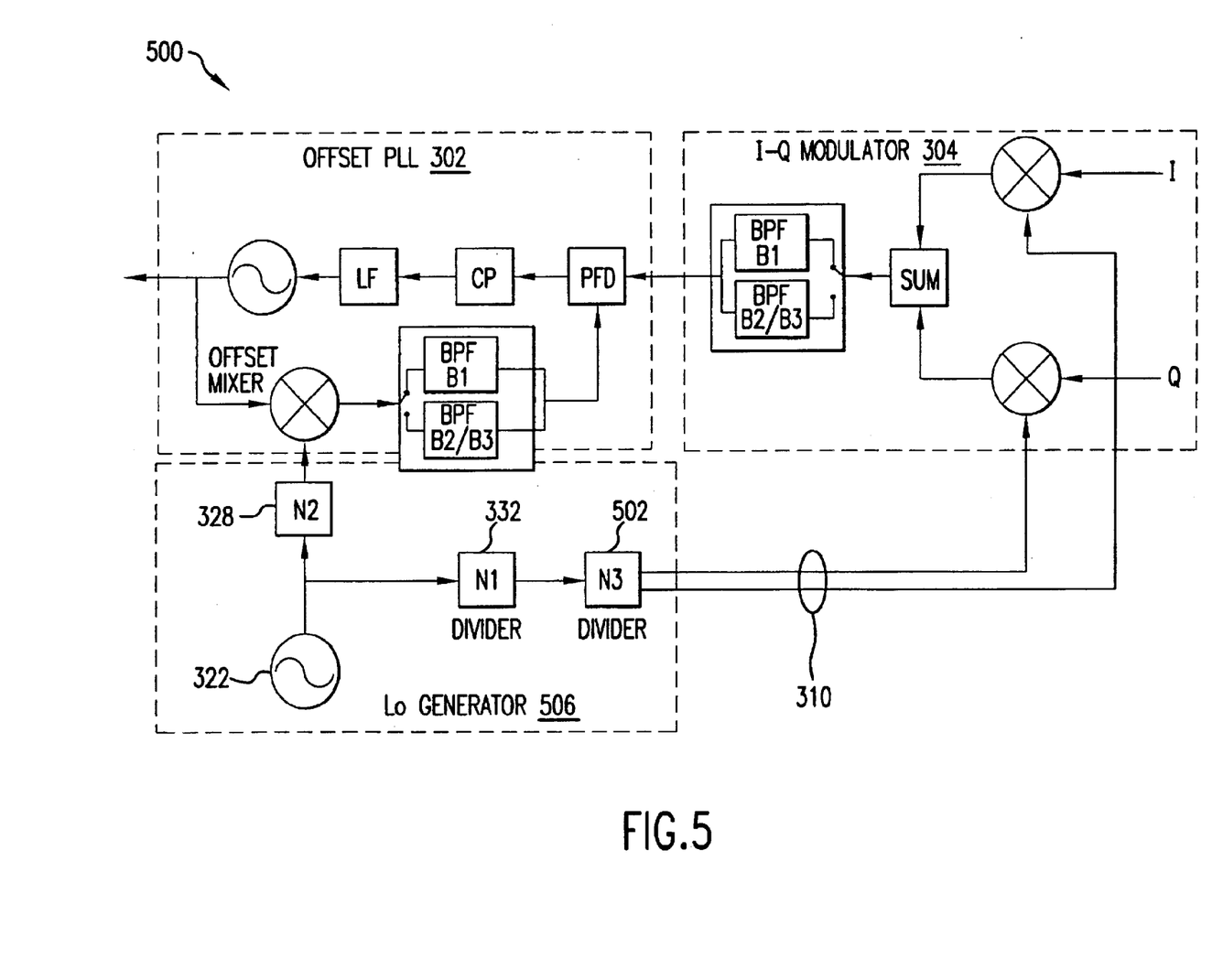
FIG. 5 is a block diagram of yet another example transmitter corresponding to the transmitter of FIG. 1.

FIG. 5 is a block diagram of an example transmitter 500 corresponding to transmitter 102, according to yet another embodiment of the present invention. Transmitter 500 operates in accordance with the generalized frequency plan of Table 1, and in accordance with the specific frequency plan of Table 3, below. Transmitter 500 includes an LO generator 506 similar to LO generator 306, with the following exceptions. The divide-by-two dividers 330 and 334 of LO generator 306 are omitted from LO generator 506. LO generator 406 includes a programmable divider 502 (N3) following divider 332, instead of divide-by-two divider 334.

For example, oscillator 322 generates source LO signal 324 at the required frequency.

Figure 6:
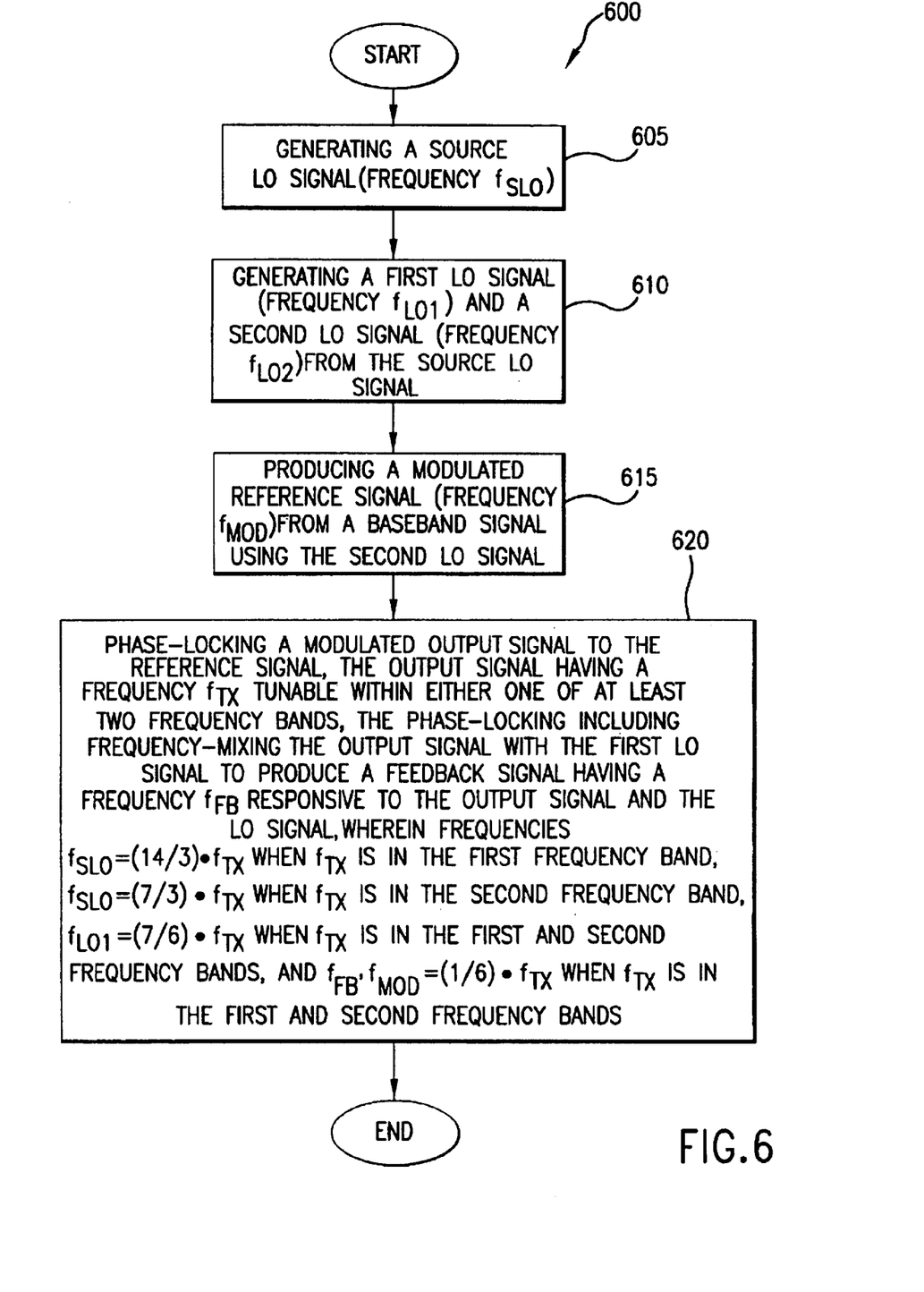
FIG. 6 is a flow chart of an example method of operating a transmitter of the present invention in accordance with a frequency plan of the present invention.

Method 600 includes a second step 610 of generating a first LO signal at a frequency $f_{LO1}$ and a second LO signal at a frequency $f_{LO2}$ from the source LO signal. For example, LO generator 306 generates first and second LO signals 308 and 310 at respective frequencies $f_{LO1}$ and $f_{LO2}$.

Method 600 includes a third step 615 of producing a modulated reference signal at a frequency $f_{MOD}$ from a baseband signal using the second LO signal. For example, modulator 305 produces modulated reference signal 316 from baseband signals 314I and 314Q, using LO signals 310I and 310Q. Method 600 includes a next step 620 of phase-locking a modulated output signal to the reference signal, the output signal having a frequency $f_{TX}$ tunable within either one of at least two frequency bands, the phase-locking step including frequency-mixing the output signal with the first LO signal to produce a feedback signal having a frequency $f_{FB}$ responsive to the output signal and the LO signal, wherein:

$f_{SLO}=(14/3) \cdot f_{TX}$ when $f_{TX}$ is in the first frequency band, $f_{SLO}=(7/3) \cdot f_{TX}$ when $f_{TX}$ is in the second frequency band, $f_{LO1}=(7/6) \cdot f_{TX}$ when $f_{TX}$ is in the first and second frequency bands, and $f_{FB}, f_{MOD}=(1/6) \cdot f_{TX}$ when $f_{TX}$ is in the first and second frequency bands.

For example, PLL 302 phase-locks output signal 110 to reference signal 316 in accordance with method step 620.

Simulation Results

Figure 7:
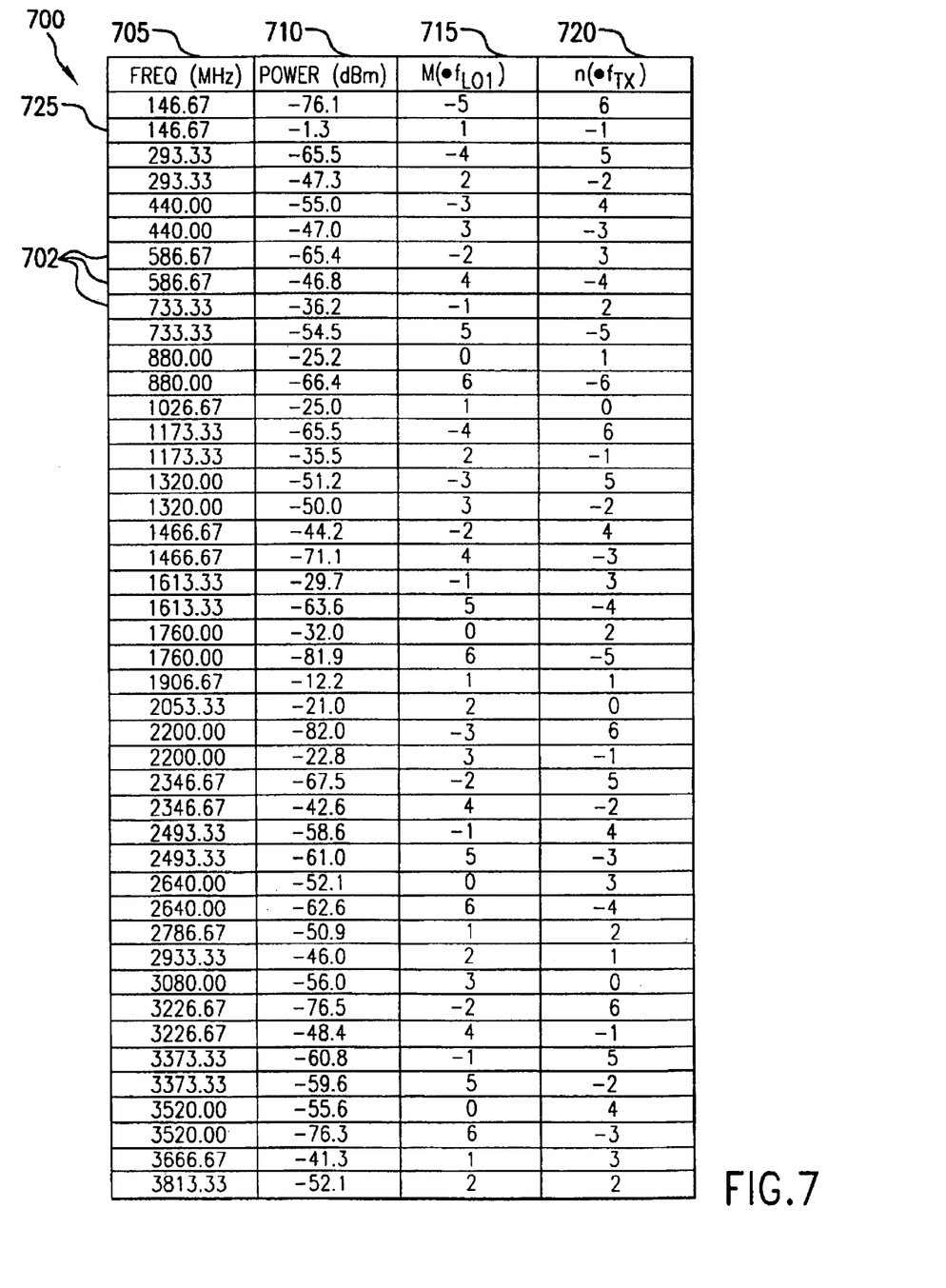
FIG. 7 is a Table representing simulation results achieved by a transmitter using the frequency plan of the present invention.

FIG. 7 is a Table 700 representing simulation results achieved by a transmitter using the frequency plan of the present invention. The simulation results of Table 700 correspond to a transmit scenario in which frequency $f_{TX}$ is within example frequency band B1 having minimum and maximum frequencies of 888 MHz and 915 MHz, respectively. Table 700 includes a plurality of rows, each row corresponding to a mixer product produced by offset mixer 370 in response to frequencies $f_{LO1}$ and $f_{TX}$. A first column 705 identifies a frequency corresponding to each mixer product. A second column 710 identifies an absolute power level in dBm corresponding to each mixer product. Each mixer product is given by the relationship: $m \cdot f_{LO}+n \cdot f_{TX}$, where m and n are integers. Thus, third and fourth columns

TABLE 3

Specific Frequency Plan (frequencies in MHz)

| | B1 (e.g., GSM) | | B2 (e.g., DCS) | | B3 (e.g., PCS) | |
|---|---|---|---|---|---|---|
| | Min Freq. | Max Freq. | Min. Freq. | Max. Freq. | Min. Freq. | Max. Freq. |
| $f_{TX}$ range | 880 | 915 | 1710 | 1785 | 1850 | 1910 |
| $f_{SLO}$ range | 4106.667 | 4270 | 3990 | 4165 | 4316.667 | 4456.667 |
| Ni | 7 | 7 | 7 | 7 | 7 | 7 |
| N2 | 4 | 4 | 2 | 2 | 2 | 2 |
| N3 | 4 | 4 | 2 | 2 | 2 | 2 |
| $f_{FB}$ | 146.7 | 152.5 | 285.0 | 297.5 | 308.3 | 318.3 |
| $f_{LO1}$ | 1026.667 | 1067.5 | 1995.0 | 2082.5 | 2158.333 | 2228.333 |
| $f_{MOD}$ | 146.7 | 152.5 | 285.0 | 297.5 | 308.3 | 318.3 |

Method Flow Chart

FIG. 6 is a flow chart of an example method 600 according to the present invention. Method 600 includes a first step 605 of generating a source LO signal at a frequency $f_{SLO}$.

715 and 720 identify respective integer multiples m and n for each mixer product. A row 725 corresponds to a desired mixer product, that is, desired IF frequency $f_{FB}$, having m=1 and n=−1 (that is, frequency $f_{FB}=f_{LO}-f_{TX}$). As a result of the frequency plan of the present invention, the desired mixer product has an amplitude (−1.3 dBm) substantially higher than the amplitudes of the other, undesired mixer products.

Controller

An external controller controls transmitters 300, 400 and 500 so that the transmitters operate in accordance with the principles of the present invention described above. The controller may include any conventional controller including digital, analog, and/or computer control logic. A memory, coupled to the controller, may store frequency plan information, according to the above described frequency plans, whereby the controller may control the selection of the frequencies for the transmitters in accordance with the stored frequency plan information. The controller generates control signals 388, 312, and 358 for controlling the transmitters according to the description above, as would be apparent to one of ordinary skill in the relevant arts.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A transmitter apparatus, comprising:
    a local oscillator (LO) generator that generates an LO signal having a tunable frequency $f_{LO1}$; and
    a phase-locked-loop (PLL) that generates an output signal that is phase-locked to a reference signal, the output signal having a frequency $f_{TX}$ tunable within at least first and second alternative frequency bands responsive to the LO signal, the PLL including a feedback path for generating a feedback signal having a desired frequency $f_{FB}$ responsive to the frequencies $f_{TX}$ and $f_{LO1}$, wherein
    the frequency $f_{FB}$ is approximately equal to 1/6 the frequency $f_{TX}$ when the frequency $f_{TX}$ is in at least one of the first and second alternative frequency bands, and
    the frequency $f_{LO1}$ is approximately equal to 7/6 the frequency $f_{TX}$ when the frequency $f_{TX}$ is in at least one of the first and second alternative frequency bands.

2. The apparatus of claim 1, wherein:
    the frequency $f_{FB}$ is approximately equal to 1/6 the frequency $f_{TX}$ when the frequency $f_{TX}$ is in each of the first and second alternative frequency bands; and
    the frequency $f_{LO1}$ is approximately equal to 7/6 the frequency $f_{TX}$ when the frequency $f_{TX}$ is in each of the first and second alternative frequency bands.

3. The apparatus of claim 1, wherein the frequency $f_{FB}$ represents a difference between frequency $f_{LO1}$ and frequency $f_{TX}$.

4. The apparatus of claim 1, wherein the LO generator includes:
    a source oscillator for generating a source signal having a frequency $f_{SLO}$; and
    a frequency divider circuit to produce the LO signal from the source signal, wherein a ratio of the frequency $f_{SLO}$ when the frequency $f_{TX}$ is in the first frequency band to the frequency $f_{SLO}$ when the frequency $f_{TX}$ is in the second frequency band is approximately 2:1.

5. The apparatus of claim 4, wherein the LO generator includes:
    a source oscillator for generating a source signal having a frequency $f_{SLO}$; and
    a frequency divider circuit to produce the LO signal from the source signal, wherein
    the frequency $f_{SLO}$ is approximately equal to 14/3 the frequency $f_{TX}$ when the frequency $f_{TX}$ is in the first frequency band, and
    the frequency $f_{SLO}$ is approximately equal to 7/3 the frequency $f_{TX}$ when the frequency $f_{TX}$ is in the second frequency band.

6. The apparatus of claim 5, wherein the frequency $f_{TX}$ is tunable within a third frequency band, and when the frequency $f_{TX}$ is in the third frequency band
    the frequency $f_{SLO}$ is approximately equal to 7/3 the frequency $f_{TX}$,
    the frequency $f_{LO1}$ is approximately equal to 7/6 the frequency $f_{TX}$, and
    the frequency $f_{FB}$ is approximately equal to 1/6 the frequency $f_{TX}$.

7. The apparatus of claim 1, wherein the frequency $f_{FB}$ is a first intermediate frequency when the frequency $f_{TX}$ is in the first frequency band and a second intermediate frequency separated from the first intermediate frequency when the frequency $f_{TX}$ is in the second frequency band, the PLL feedback path comprising:
    an offset mixer for generating the feedback signal having the desired frequency $f_{FB}$ responsive to the frequencies $f_{TX}$ and $f_{LO1}$;
    a first filter, following the offset mixer, that passes the first intermediate frequency and rejects first spurious energy offset in frequency from the first intermediate frequency when the frequency $f_{TX}$ is in the first frequency band; and
    a second filter, following the offset mixer, that passes the second intermediate frequency and rejects second spurious energy offset in frequency from the second intermediate frequency when the frequency $f_{TX}$ is in the second frequency band.

8. The apparatus of claim 7, wherein the combination of frequencies $f_{LO1}$ and $f_{TX}$ causes
    the first spurious energy to be offset in frequency from the first intermediate frequency by at least an integer multiple of the first intermediate frequency, and
    the second spurious energy to be offset in frequency from the second intermediate frequency by at least an integer multiple of the second intermediate frequency.

9. The apparatus of claim 7, wherein the first and second bandpass filters are each adapted to produce a respective filtered feedback signal, the PLL further including:
    a phase or frequency detector that derives an error signal responsive to the reference signal and a respective one of the filtered feedback signals;

a control signal deriving circuit following the phase or frequency detector that derives a control signal from the error signal; and a Voltage Controlled Oscillator (VCO), following the control signal deriving circuit, that generates the phase-locked output signal responsive to the control signal.

10. The apparatus of claim 1, wherein:

the first frequency band extends approximately between 880 MHz and 915 MHz; and the second frequency band extends between one of the following, approximately between 1710 MHz and 1785 MHz, or approximately between 1850 MHz and 1910 MHz.

11. The apparatus of claim 1, wherein the frequency $f_{TX}$ is tunable within a third frequency band, and the first frequency band extends approximately between 880 MHz and 915 MHz, the second frequency band extends approximately between 1710 MHz and 1785 MHz, and the third frequency band extends approximately between 1850 MHz and 1910 MHz.

12. The apparatus of claim 1, wherein the reference signal and the output signal each include at least one of a phase modulated signal component and a frequency modulated signal component.

13. The apparatus of claim 12, wherein the LO generator is adapted to generate a second LO signal, the apparatus further comprising:

a modulator that modulates the second LO signal with a baseband signal to produce the reference signal such that the reference signal has a frequency $f_{MOD}$ substantially equal to the feedback frequency $f_{FB}$.

14. A transmitter apparatus, comprising:

a source oscillator for generating a source signal having a frequency $f_{SLO}$;

a frequency divider circuit to produce, from the source signal, a local oscillator (LO) signal having a tunable frequency $f_{LO1}$; and a phase-locked-loop (PLL) that generates an output signal that is phase-locked to a reference signal, the output signal having a frequency $f_{TX}$ tunable within at least first and second alternative frequency bands responsive to the LO signal, the PLL including an offset mixer in a feedback path of the PLL for generating a feedback signal having a frequency $f_{FB}$ responsive to the frequencies $f_{TX}$ and $f_{LO1}$, wherein the frequency $f_{SLO}$ is approximately equal to 14/3 the frequency $f_{TX}$ when the frequency $f_{TX}$ is in the first frequency band, the frequency $f_{SLO}$ is approximately equal to 7/3 the frequency $f_{TX}$ when the frequency $f_{TX}$ is in the second frequency band, the frequency $f_{LO1}$ is approximately equal to 7/6 the frequency $f_{TX}$ when the frequency $f_{TX}$ is in each of the first and second alternative frequency bands, and the frequency $f_{FB}$ is approximately equal to 1/6 the frequency $f_{TX}$ when the frequency $f_{TX}$ is in each of the first and second alternative frequency bands.

15. The apparatus of claim 14, wherein the frequency $f_{TX}$ is tunable within a third alternative frequency band, and when the frequency $f_{TX}$ is in the third frequency band the frequency $f_{SLO}$ is approximately equal to 7/3 the frequency $f_{TX}$ the frequency $f_{LO1}$ is approximately equal to 7/6 the frequency $f_{TX}$, and the frequency $f_{FB}$ is approximately equal to 1/6 the frequency $f_{TX}$.

16. The apparatus of claim 14, wherein:

the first frequency band extends approximately between 880 MHz and 915 MHz;

the second frequency band extends approximately between 1710 MHz and 1785 MHz; and the third frequency band extends approximately between 1850 MHz and 1910 MHz.

17. A transmitter apparatus, comprising:

a local oscillator (LO) generator that generates an LO signal having a frequency $f_{LO1}$; and a phase-locked-loop (PLL) that generates an output signal that is phase-locked to a reference signal, the output signal having a frequency $f_{TX}$ tunable within first and second alternative frequency bands responsive to the LO signal, the first frequency band extending approximately between 880 MHz and 915 MHz, the second frequency band extending either approximately between 1710 MHz and 1785 MHz or approximately between 1850 MHz and 1910 MHz, the PLL including an offset mixer in a feedback path of the PLL for generating a feedback signal having a frequency $f_{FB}$ responsive to the frequencies $f_{TX}$ and $f_{LO1}$, wherein the frequency $f_{LO1}$ is approximately equal to 7/6 the frequency $f_{TX}$ when the frequency $f_{TX}$ is in each of the first and second alternative frequency bands, and the frequency $f_{FB}$ is approximately equal to 1/6 the frequency $f_{TX}$ when the frequency $f_{TX}$ is in each of the first and second alternative frequency bands.

18. The apparatus of claim 17, wherein the frequency $f_{TX}$ is tunable within a third alternative frequency band, the third frequency band extending either approximately between 1710 MHz and 1785 MHz when the second frequency band extends approximately between 1850 MHz and 1910 MHz, or approximately between 1850 MHz and 1910 MHz when the second frequency band extends approximately between 1710 MHz and 1785 MHz, and when frequency $f_{TX}$ is in the third frequency band, the frequency $f_{SLO}$ is approximately equal to 7/3 the frequency $f_{TX}$, the frequency $f_{LO1}$ is approximately equal to 7/6 the frequency $f_{TX}$, and the frequency $f_{FB}$ is approximately equal to 1/6 the frequency $f_{TX}$.

19. The apparatus of claim 17, wherein the LO generator includes:

a source oscillator for generating a source signal having a frequency $f_{SLO}$; and a frequency divider circuit to produce the LO signal from the source signal, wherein the frequency $f_{SLO}$ is approximately equal to 14/3 the frequency $f_{TX}$ when the frequency $f_{TX}$ is in the first frequency band, and the frequency $f_{SLO}$ is approximately equal to 7/3 the frequency $f_{TX}$ when the frequency $f_{TX}$ is in the second frequency band.

20. A transmit apparatus, comprising:

a source oscillator for generating a source signal having a frequency $f_{SLO}$;

a frequency divider circuit to produce, from the source signal, a local oscillator (LO) signal having a tunable frequency; and a phase-locked-loop (PLL) that generates an output signal that is phase-locked to a reference signal, the output signal having a frequency $f_{TX}$ tunable within at least first and second alternative frequency bands responsive to the LO signal, the PLL including an offset mixer in a feedback path of the PLL for generating a feedback signal having a frequency $f_{FB}$ responsive to the frequencies $f_{TX}$ and $f_{LO1}$, wherein the frequency $f_{SLO}$ is approximately equal to 14/3 the frequency $f_{TX}$ when the frequency $f_{TX}$ is in the first frequency band, and the frequency $f_{SLO}$ is approximately equal to 7/3 the frequency $f_{TX}$ when the frequency $f_{TX}$ is in the second frequency band.

21. A transmitter apparatus, comprising:

a source oscillator that generates a source signal having a frequency $f_{SLO}$;

divider circuits for generating from the source signal a first local oscillator (LO) signal having a frequency $f_{LO1}$ and a second LO signal having a frequency $f_{LO2}$;

a modulator for generating a modulated reference signal having a frequency $f_{MOD}$ based on the second LO signal;

a phase-locked-loop (PLL) that generates an output signal that is phase-locked to the reference signal, the output signal having a frequency $f_{TX}$ tunable within at least first and second alternative frequency bands responsive to the first LO signal, the PLL including an offset mixer in a feedback path of the PLL for generating a feedback signal having a frequency $f_{FB}$ responsive to the frequencies $f_{TX}$ and $f_{LO1}$, the transmitter apparatus being configured to operate in accordance with a frequency plan, wherein the frequency plan specifies that frequency $f_{SLO}$ is approximately equal to 14/3 the frequency $f_{TX}$ when frequency $f_{TX}$ is in the first frequency band, frequency $f_{SLO}$ is approximately equal to 7/3 the frequency $f_{TX}$ when frequency $f_{TX}$ is in the second frequency band, frequency $f_{FB}$ is approximately equal to 1/6 the frequency $f_{TX}$ when frequency $f_{TX}$ is in each of the first and second alternative frequency bands, frequency $f_{MOD}$ is approximately equal to 1/6 the frequency $f_{TX}$ when frequency $f_{TX}$ is in each of the first and second alternative frequency bands, frequency $f_{LO1}$ is approximately equal to 7/6 the frequency $f_{TX}$ when frequency $f_{TX}$ is in each of the first and second alternative frequency bands, and frequency $f_{LO2}$ is approximately equal to 1/6 the frequency $f_{TX}$ when frequency $f_{TX}$ is in each of the first and second alternative frequency bands.

22. A method, comprising:

(a) generating a local oscillator (LO) signal having a tunable frequency $f_{LO1}$; and (b) phase-locking an output signal to a reference signal, the output signal having a frequency $f_{TX}$ tunable within at least first and second alternative frequency bands, said phase-locking including producing a feedback signal having a desired frequency $f_{FB}$ responsive to the frequencies $f_{TX}$ and $f_{LO1}$, wherein the frequency $f_{FB}$ is approximately equal to 1/6 the frequency $f_{TX}$ when the frequency $f_{TX}$ is in at least one of the first and second alternative frequency bands, and the frequency $f_{LO1}$ is approximately equal to 7/6 the frequency $f_{TX}$ when the frequency $f_{TX}$ is in at least one of the first and second alternative frequency bands.

23. The method of claim 22, wherein:

the frequency $f_{FB}$ is approximately equal to 1/6 the frequency $f_{TX}$ when the frequency $f_{TX}$ is in each of the first and second alternative frequency bands; and the frequency $f_{LO1}$ is approximately equal to 7/6 the frequency $f_{TX}$ when the frequency $f_{TX}$ is in each of the first and second alternative frequency bands.

24. The method of claim 22, wherein step (a) includes:

generating a source signal having a frequency $f_{SLO}$; and frequency dividing the source signal to produce the LO signal, wherein a ratio of the frequency $f_{SLO}$ when the frequency $f_{TX}$ is in the first frequency band to the frequency $f_{SLO}$ when the frequency $f_{TX}$ is in the second frequency band is approximately 2:1.

25. The method of claim 24, wherein the frequency $f_{SLO}$ is approximately equal to 14/3 the frequency $f_{TX}$ when the frequency $f_{TX}$ is in the first frequency band, and the frequency $f_{SLO}$ is approximately equal to 7/3 the frequency $f_{TX}$ when the frequency $f_{TX}$ is in the second frequency band.

26. The method of claim 25, wherein the frequency $f_{TX}$ is tunable within a third alternative frequency band, and when the frequency $f_{TX}$ is in the third frequency band the frequency $f_{SLO}$ is approximately equal to 7/3 the frequency $f_{TX}$, the frequency $f_{LO1}$ is approximately equal to 7/6 the frequency $f_{TX}$, and the frequency $f_{FB}$ is approximately equal to 1/6 the frequency $f_{TX}$.

27. The method of claim 22, wherein the frequency $f_{FB}$ is a first intermediate frequency when the frequency $f_{TX}$ is in the first frequency band and a second intermediate frequency separated from the first intermediate frequency when the frequency $f_{TX}$ is in the second frequency band, and wherein step (b) further comprises:

producing the feedback signal by frequency-mixing the output signal with the LO signal;

filtering the feedback signal to pass the first intermediate frequency and reject first spurious energy offset in frequency from the first intermediate frequency when the frequency $f_{TX}$ is in the first frequency band; and filtering the feedback signal to pass the second intermediate frequency and reject second spurious energy offset in frequency from the second intermediate frequency when the frequency $f_{TX}$ is in the second frequency band.

28. The method of claim 27, wherein said frequency-mixing comprises generating the frequency $f_{FB}$ as a difference between the frequency $f_{LO1}$ and the frequency $F_{TX}$.

29. The method of claim 27, wherein each said filtering step produces a respective filtered feedback signal, and wherein step (b) further comprises:

deriving an error signal responsive to the reference signal and a respective one of the filtered feedback signals;

deriving a control signal from the error signal; and generating the phase-locked output signal responsive to the control signal.

30. The method of claim 22, wherein:

the first frequency band extends approximately between 880 MHz and 915 MHz; and the second frequency band extends between one of the following,
approximately between 1710 MHz and 1785 MHz, or
approximately between 1850 MHz and 1910 MHz.

31. The method of claim 22, wherein the frequency $f_{TX}$ is tunable within a third alternative frequency band, and
the first frequency band extends approximately between 880 MHz and 915 MHz,
the second frequency band extends approximately between 1710 MHz and 1785 MHz, and
the third frequency band extends approximately between 1850 MHz and 1910 MHz.

32. The method of claim 22, wherein the reference signal and the output signal each include at least one of a phase modulated component and a frequency modulated component.

33. The method of claim 32, further comprising:
generating a second LO signal; and
producing the reference signal from a baseband signal using the second LO signal.

34. A method, comprising:
generating a source signal having a tunable frequency $f_{SLO}$;
producing a local oscillator (LO) signal having a tunable frequency $f_{LO1}$ by frequency-dividing down the frequency $f_{SLO}$ to the frequency $f_{LO1}$; and
phase-locking an output signal to a reference signal, the output signal having a frequency $f_{TX}$ tunable within at least first and second alternative frequency bands responsive to the LO signal, said phase-locking including frequency-mixing the output signal with the LO signal to produce a feedback signal having a frequency $f_{FB}$ responsive to the frequencies $f_{TX}$ and $f_{LO1}$, wherein
the frequency $f_{SLO}$ is approximately equal to 14/3 the frequency $f_{TX}$ when the frequency $f_{TX}$ is in the first frequency band,
the frequency $f_{SLO}$ is approximately equal to 7/3 the frequency $f_{TX}$ when the frequency $f_{TX}$ is in the second frequency band,
the frequency $f_{LO1}$ is approximately equal to 7/6 the frequency $f_{TX}$ when the frequency $f_{TX}$ is in each of the first and second alternative frequency bands, and
the frequency $f_{FB}$ is approximately equal to 1/6 the frequency $f_{TX}$ when the frequency $f_{TX}$ is in each of the first and second alternative frequency bands.

35. The method of claim 34, wherein the frequency $f_{TX}$ is tunable within a third alternative frequency band, and when the frequency $f_{TX}$ is in the third frequency band
the frequency $f_{SLO}$ is approximately equal to 7/3 the frequency $f_{TX}$
the frequency $f_{LO1}$ is approximately equal to 7/6 the frequency $f_{TX}$, and
the frequency $f_{FB}$ is approximately equal to 1/6 the frequency $f_{TX}$.

36. The method of claim 34, wherein:
the first frequency band extends approximately between 880 MHz and 915 MHz;
the second frequency band extends approximately between 1710 MHz and 1785 MHz; and
the third frequency band extends approximately between 1850 MHz and 1910 MHz.

37. A method, comprising:
(a) generating a local oscillator (LO) signal having a frequency $f_{LO1}$; and
(b) phase-locking an output signal to a reference signal, the output signal having a frequency $f_{TX}$ tunable within first and second alternative frequency bands responsive to the LO signal, the first frequency band extending approximately between 880 MHz and 915 MHz, the second frequency band extending either approximately between 1710 MHz and 1785 MHz or approximately between 1850 MHz and 1910 MHz, said phase-locking including frequency-mixing the output signal with the LO signal to produce a feedback signal having a frequency $f_{FB}$ responsive to the frequencies $f_{TX}$ and $f_{LO1}$, wherein
the frequency $f_{LO1}$ is approximately equal to 7/6 the frequency $f_{TX}$ when the frequency $f_{TX}$ is in each of the first and second alternative frequency bands, and
the frequency $f_{FB}$ is approximately equal to 1/6 the frequency $f_{TX}$ when the frequency $f_{TX}$ is in each of the first and second alternative frequency bands.

38. The method of claim 37, wherein the frequency $f_{TX}$ is tunable within a third alternative frequency band, the third frequency band extending either
approximately between 1710 MHz and 1785 MHz when the second frequency band extends approximately between 1850 MHz and 1910 MHz, or
approximately between 1850 MHz and 1910 MHz when the second frequency band extends approximately between 1710 MHz and 1785 MHz, and
when frequency $f_{TX}$ is in the third frequency band,
the frequency $f_{SLO}$ is approximately equal to 7/3 the frequency $f_{TX}$,
the frequency $f_{LO1}$ is approximately equal to 7/6 the frequency $f_{TX}$, and
the frequency $f_{FB}$ is approximately equal to 1/6 the frequency $f_{TX}$.

39. The method of claim 37, wherein step (a) includes:
generating a source signal having a frequency $f_{SLO}$; and
frequency-dividing the source signal to produce the LO signal, wherein
the frequency $f_{SLO}$ is approximately equal to 14/3 the frequency $f_{TX}$ when the frequency $f_{TX}$ is in the first frequency band, and
the frequency $f_{SLO}$ is approximately equal to 7/3 the frequency $f_{TX}$ when the frequency $f_{TX}$ is in the second frequency band.

40. A method, comprising:
generating a source signal having a tunable frequency $f_{SLO}$;
frequency dividing the source signal to produce a local oscillator (LO) signal having a tunable frequency; and
phase-locking an output signal to a reference signal, the output signal having a frequency $f_{TX}$ tunable within at least first and second alternative frequency bands responsive to the LO signal, said phase-locking including frequency-mixing the output signal with the LO signal to produce a feedback signal having a frequency $f_{FB}$ responsive to the frequencies $f_{TX}$ and $f_{LO1}$, wherein
the frequency $f_{SLO}$ is approximately equal to 14/3 the frequency $f_{TX}$ when the frequency $f_{TX}$ is in the first frequency band, and
the frequency $f_{SLO}$ is approximately equal to 7/3 the frequency $f_{TX}$ when the frequency $f_{TX}$ is in the second frequency band.

* * * * *